US007458344B2

United States Patent
Holtorf

(10) Patent No.: US 7,458,344 B2
(45) Date of Patent: Dec. 2, 2008

(54) MOTORCYCLE ENGINE METHOD AND APPARATUS

(76) Inventor: Brad Holtorf, 2284 Yew Street Rd. K4, Bellingham, WA (US) 98229

( * ) Notice: Subject to any disclaimer, the term of this patent is extended or adjusted under 35 U.S.C. 154(b) by 299 days.

(21) Appl. No.: 11/261,862

(22) Filed: Oct. 28, 2005

(65) Prior Publication Data
US 2006/0102114 A1 May 18, 2006

Related U.S. Application Data

(60) Provisional application No. 60/624,042, filed on Nov. 1, 2004.

(51) Int. Cl.
F02B 33/00 (2006.01)
F02B 25/00 (2006.01)

(52) U.S. Cl. .................. 123/73 PP; 123/65 V
(58) Field of Classification Search ............. 123/73 PP, 123/65 W, 65 A, 73 AB, 65 B, 192.2, 73 R, 123/73 A, 65 R, 65 PD, 65 P, 65 V
See application file for complete search history.

(56) References Cited

U.S. PATENT DOCUMENTS

| 3,905,340 | A |   | 9/1975  | Boyesen |          |
|-----------|---|---|---------|---------|----------|
| 4,000,723 | A |   | 1/1977  | Boyesen |          |
| 4,051,820 | A | * | 10/1977 | Boyesen | 123/73 A |
| 4,228,770 | A | * | 10/1980 | Boyesen | 123/73 V |
| 4,474,145 | A | * | 10/1984 | Boyesen | 123/73 PP|
| 4,643,139 | A |   | 2/1987  | Hargreaves |       |
| 4,696,263 | A |   | 9/1987  | Boyesen |          |
| 4,739,732 | A | * | 4/1988  | Nakamura | 123/73 V|
| 4,748,944 | A |   | 6/1988  | Iida et al. |       |
| 4,825,821 | A |   | 5/1989  | Baltz |            |
| 4,836,151 | A |   | 6/1989  | Litjens et al. |    |
| 4,879,976 | A | * | 11/1989 | Boyesen | 123/65 V |
| 4,905,638 | A |   | 3/1990  | Curtis et al. |     |
| 5,027,754 | A |   | 7/1991  | Morone et al. |     |
| 5,245,956 | A |   | 9/1993  | Martin et al. |     |

* cited by examiner

Primary Examiner—Stephen K Cronin
Assistant Examiner—Ka Chun Leung
(74) Attorney, Agent, or Firm—Jellett Law, PS; Matthew Jellett

(57) ABSTRACT

An assembly modification of an existing two-stroke single cylinder 43 CC to 52 CC combustion engine. The assembly substantially increases the horsepower of the stock two-stroke engines. The modifications include using a reed valve kit which is modified to connect to the threaded carburetor connection bolt holes on the outside of the engine casing at the intake port. A drilled excavation in the interior face of the engine cylinder to provide for an additional transfer port at the location of the fuel/air intake port is also provided. The additional transfer port has a roof with varying angles of inflection depending on the performance characteristics desired during operation of the combustion engine. The reed valve kit also provides additional configurations for larger or smaller carburetors located at the intake port of the reed valve block. The piston skirt is modified for an additional opening at the intake port for providing fuel air mixture into the crank case for additional volume intake.

17 Claims, 7 Drawing Sheets

MOTORCYCLE ENGINE METHOD AND APPARATUS

RELATED APPLICATIONS

This application claims priority benefit of U.S. Ser. No. 60/624,042, filed Nov. 1, 2004.

BACKGROUND OF THE INVENTION a) Field of the Invention

The current embodiment applies to the field of two-stroke engines utilized generally with devices such as scooters, jet skis, motorbikes, chainsaws and other small motorized equipment. The current modification and assembly provides additional power output for existing 43 cc to 52 cc 2-cycle engine such as the Mitsubishi Keyang 2-cycle engine series, and modifies existing engine elements, and includes an additional reed valve control block.

b) Background Art

U.S. Pat. No. 5,245,956 discloses a reed valve assembly which includes a two-ported base member adapted for placement within a fuel/air supply of an engine. The reed valve uses reed petals and clamping bars to hold the reed petals in place, the reed petals are flexible and allow for the fuel air flow mixture pass-through during the intake cycle, the clamping bar, allows adjustment of the flexing tension for fine-tuning of the valve operation.

U.S. Pat. No. 5,027,754 discloses a nonreturn valve of the flap tie for flow concentration, which is designed for induction pipes of cylinders of internal combustion engines for vehicles, the induction pipes are curved and have internal dividers parallel to the side walls capable of engaging flexible airtight enclosure flaps to form airflow channels.

U.S. Pat. No. 4,905,638 discloses a two-stage carburetor which provides induction of air fuel mixture into a crank case of a two-stroke marine engine. A series of throttle bores deliver an air fuel mixture to separate and distinct reed blocks.

U.S. Pat. No. 4,879,976 discloses a reed valve mechanism for engines, which supplies the fuel air mixture for an internal combustion engine and has passages, ports, and reed valves which are all minimized or minimally arranged to avoid fluctuations in flow velocity and delivery of the fuel air mixture to the cylinder of the engine thus increasing power.

U.S. Pat. No. 4,836,151 discloses a two cycle engine with turbulence generator at reed valves. The turbulence generator is essentially a rotating fan in the fuel air stream which provides uniform distribution of the fuel air mixture.

U.S. Pat. No. 4,825,821 discloses a carburetor pulse back damping system for a two cycle internal combustion engine, where the internal combustion engine has first and second alternately fired cylinders with individual crank cases each with an air induction passage and each having separate reed valves, also, each having throttle valves that are movable in the induction passages, also, idle speed ports respectively communicating with first and second air induction passages.

U.S. Pat. No. 4,748,944 discloses a reed valve device for a two cycle engine, the valves have several ports with the valves themselves each having one end secured to the housing and movable at the nonsecured end. The valve has two main shafts which are rotatably supported on the housing, and coupled together for synchronous rotation by the gear plate to rotate the valves themselves. Each main shaft has a stopper to engage the valve, the stopper increases spring constant in the reed valve, allowing the reed valve to move to an open position when the engine exceeds a predetermined speed.

U.S. Pat. No. 4,739,732 discloses a kit for attaching reed valves for two cycle engines, such engines including a jet propelled small sized boat which has an inlet manifold where the kit has a base plate, carburetor plate, and a reed valve case. The base plate is formed with two types of holes, plain holes through which attaching bolts are screwed into the threaded holes in a cylinder block, and threaded holes to be used in attaching the reed valve case itself. The arrangement allows the reed valves to be fitted in between the reed valve case and the carburetor plate.

U.S. Pat. No. 4,696,263 discloses a reed valve for internal combustion engines, where the valve itself has protective coatings of synthetic rubber.

U.S. Pat. No. 4,643,139 discloses a reed valve for internal combustion engines, where the valve has an aperture which is closable by a resilient valve member which is composed of an epoxide resin laminate. Laminate preferably including cotton.

U.S. Pat. No. 4,474,145 discloses a fuel supply system for internal combustion engine, where the engine has a reed valve in the fuel air supply system and uses an element in the flow path of the fuel air where the element is shaped in position to promote uniformity of flow of the fuel air mixture into the flow passage.

U.S. Pat. No. 4,228,770 discloses an internal combustion engine fuel supply system which has an inlet porting in a fuel supply passage with a valve control, the valve tends to equalize the velocity of flow through the supply passage in different regions.

U.S. Pat. No. 4,051,820 discloses an engine valving and porting engine for a two cycle crank case compression internal combustion engine which has extended and specially positioned intake ports and reed-type intake valves where the porting and valving are arranged to prove various operating characteristics of the engine. Referring to column 7 at line 25, the supercharging effect results from the low pressure wake occurring in the crank case as the compressed charge exits from the crank case through the main transfer ports and auxiliary transfer port. Low pressure communicated through a port and piston to the intake port. This low pressure causes the reed valve to open early, delivering a charge to the auxiliary transfer port and into the inlet port through the crank case and to the transfer ports.

U.S. Pat. No. 4,000,723 discloses an engine valve means and porting, for a two cycle crank case compression internal combustion engine which has an extended and specially positioned intake porting and reed-type intake valves to improve various operating characteristics of the engine.

U.S. Pat. No. 3,905,340 discloses an engine valving and porting two cycle crank case compression internal combustion engine having an extended and positioned intake porting and reed type intake valve. The porting and valves are arranged to improve the various operating characteristics of the engine.

DETAILED DESCRIPTION OF THE PREFERRED EMBODIMENTS

Two-stroke engines are utilized generally within devices such as chainsaws, jet skis, motorbikes, and including minibikes. The current embodiment deals with the modification and improved horsepower output of an existing 43-52 cc two-cycle engine for utilization in minibikes and similar applications.

Discussion of the current embodiment requires an explanation of the engine elements and operation of a standard two-stroke 50 cc engine without any reed valve or port modifications.

Figure 1:
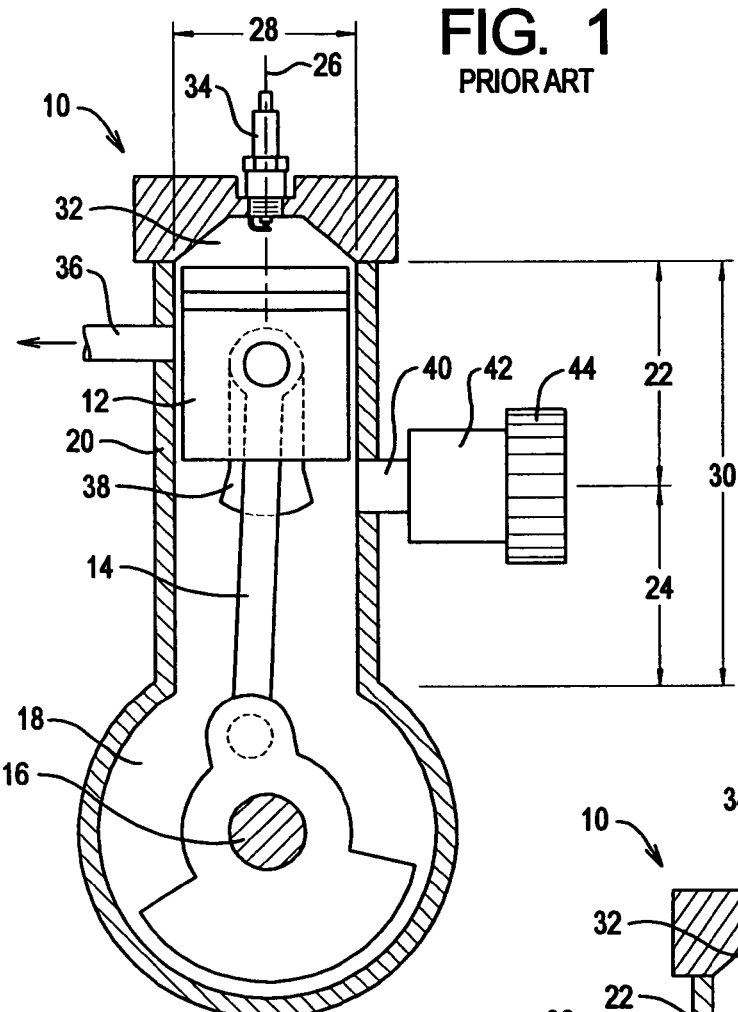
FIG. 1 shows a profile cross-sectional view of an existing two-stroke engine with the piston near the top of the upstroke cycle.

A brief discussion of the elements of the two-stroke 50 cc engine will now be provided. Referring to FIG. 1, a two-stroke 50 cc engine 10 is shown with a single piston 12 connected rotatably to a crankshaft 14 which itself is connected to the drive shaft 16. The crankshaft and drive shaft are contained within the crank case 18. The two-cycle engine has a cylinder 20 which has an upper cylinder region 22 and a lower cylinder region 24. In the current embodiment, the cylinder region is arranged around a longitudinal central axis 26 having a constant inner diameter 28 and a height 30 corresponding to the upper cylinder region 22 and the lower cylinder region 24.

At the upper end of the cylinder 20 is the combustion chamber 32. Within the combustion chamber is the ignition point for the sparkplug 34. It is within the combustion chamber that the compressed fuel air is ignited to provide the momentum for the downward stroke of the piston 12. Around the periphery of the cylinder 20 are a number of ports. The uppermost port is the exhaust port 36 providing an escape means for the combusted fuel vapor to pass out of the upper chamber 22. A pair of mirror image, opposingly opposite, transfer ports 38 are provided to transfer fuel air charges from the crank case region 18 into the upper chamber for compression of the fuel air charge within the combustion chamber 32. Lastly, an intake port 40 is provided for the insertion of the fresh air fuel mixture from the carburetor 42. Attached to the carburetor is an air filter 44.

Current two-stroke engines operate in a two-cycle mode. The first cycle will be generally described as the downward stroke and the second cycle will be generally described as the upward stroke.

Starting with the downward stroke, the piston has already compressed the fuel air charge within the combustion chamber 32. The sparkplug 34 ignites the fuel air charge and the combustion force drives the piston 12 downwards, thus rotating the drive shaft 16.

It should also be noted that previously, during the compression of the fuel air mixture within the combustion chamber 32, the first charge of fuel air mixture was drawn into the crankshaft chamber 18 or the lower chamber region 24 due to the suction created when the piston was driven upwards in the cylinder 20. This fresh charge was brought in through the intake port 40 connected to the carburetor 42.

Figure 2:
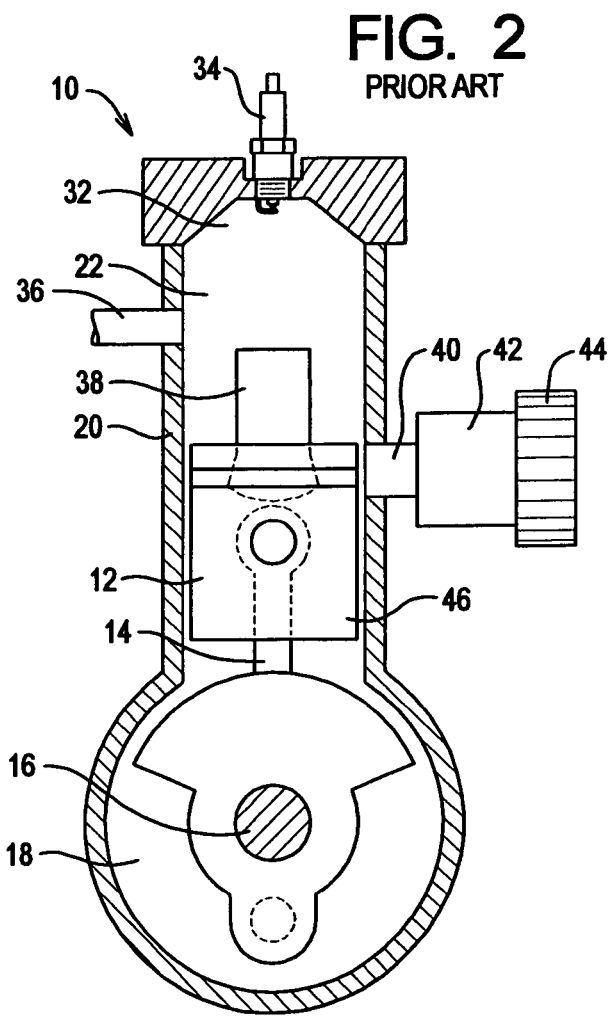
FIG. 2 shows a profile cross-sectional view of an existing two-stroke engine with the piston near the bottom of the down stroke cycle.

Referring to FIG. 2, the two-stroke engine 10 is shown with the piston 12 at the bottom of the down stroke cycle. As the piston continues in the down stroke, it opens up first the exhaust port 36 and then the transfer port 38.

Consequently, the piston skirt 46 or outer surface of the cylindrical piston 12 covers the intake port 40, restricting the inflow of additional fuel air from the carburetor 42. The spent fuel exits through the exhaust port 36, and as the piston 12 travels down, it increases the fuel air pressure within the crankshaft 18. This increased pressure within the crankshaft forces the fuel air charge through the transfer port 38 and into the upper region of the cylinder 22. Thus a fresh charge of the air fuel is provided in the upper chamber region 22 and is ready for compression into the combustion chamber 32 for another ignition of the sparkplug 34.

The piston begins its upstroke and starts to compress the fuel air within the upper cylinder chamber region 22, and concurrently begins to create a negative pressure or suction within the chamber region 18. By the time the bottom portion of the piston skirt 46 reaches the intake chamber port 40, significant vacuum pressure has occurred within crank case 18 which draws in a fresh charge of the fuel air from the carburetor 42.

The upstroke and down stroke cycles repeat themselves, generating torque on the drive shaft and powering the rotation of the wheel. Power is limited to the volumetric flow of the fuel air charge. A number of elements limit this volumetric flow, including the transfer port 38 size, the time period of recharge from the carburetor 42, and the crank case 18 volume.

To increase the availability of additional fuel and air and thus increase the horsepower of the two-stroke engine 10, additional transfer port volume 38 as well as additional volume for charging the fresh fuel and air needs to be provided.

This providing of additional transfer port volume and additional volume for charging the fresh fuel/air mixture is limited because of the existing construction of the current 43 CC to 52 CC two-cycle engine blocks. These small engines generally designed to provide a limited horsepower bandwidth and not meant to run at significantly high RPM's over an extended period of time.

Figure 3:
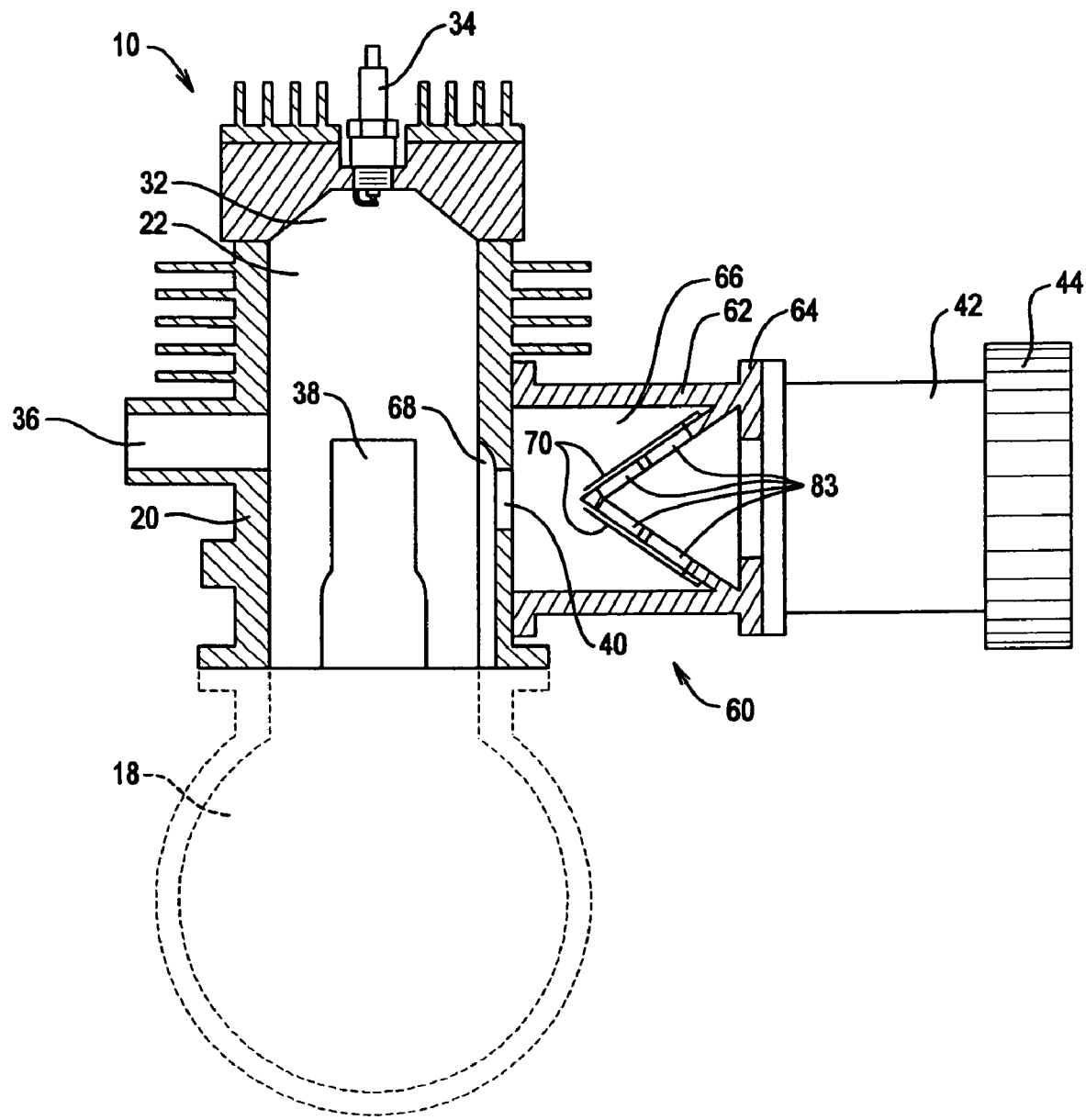
FIG. 3 shows a profile cross-sectional view of a modified two-stroke engine with an additional reed valve and modified intake port assembly.
Figure 5:
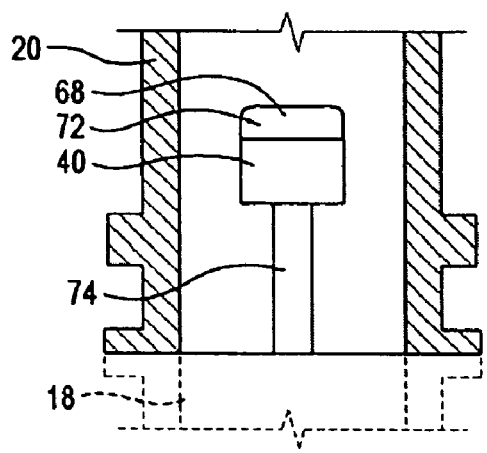
FIG. 5 shows a profile elevational view from the inside of the cylinder of the intake port and modified boost port.

Therefore, the modifications shown in the current embodiment add an additional transfer port or boost port 68, FIG. 5, in the same region as the intake port 40, as well as additional fuel air charge volume in the form of an additional reed valve block inner chamber region 66, FIG. 3, in conjunction with the crank case chamber 18. This modification to the intake port 40 allows for induction of additional fuel air charge from the intake region into first the crank case chamber region 18, and then up into the upper chamber 22 and subsequently into the combustion chamber 32.

Referring to FIG. 3, the cross-section of the modified two-stroke engine 10 with the reed valve and boost port induction assembly 60 is provided. The assembly modification includes a V-shaped reed valve block 62 specifically designed to attach to the outer surface of the cylinder 20 around the existing intake port 40. The carburetor 42 and air filter 44 are thus connected to the intake side 64 of the reed valve block 62. The reed valve block 62 has an inner chamber region 66 which provides additional volume for the fuel air recharge.

The assembly also includes a modification to the intake port 40 of the two-stroke engine 10 to take advantage of the additional reed valve induction capacity. The modification includes a mushroom shaped boost port 68, and further referring to FIG. 5, the port being machined into the cylinder wall 20 in conjunction with the existing rectangular intake port 40. The modification turns the intake port 40 into a duel operation intake port and transfer port.

The intake of the fuel air charge is no longer controlled by the cylinder skirt 46, FIG. 2, as it closes and opens the intake port 40 interface, but is now metered by the reed valve and the reed valve flaps 70.

This boost port or transfer port 68 increases the cylinder intake charge volume and cylinder exhaust scavenging to add a noticeable performance increase to the engine of around 50-100% additional power output or more.

Figure 6:
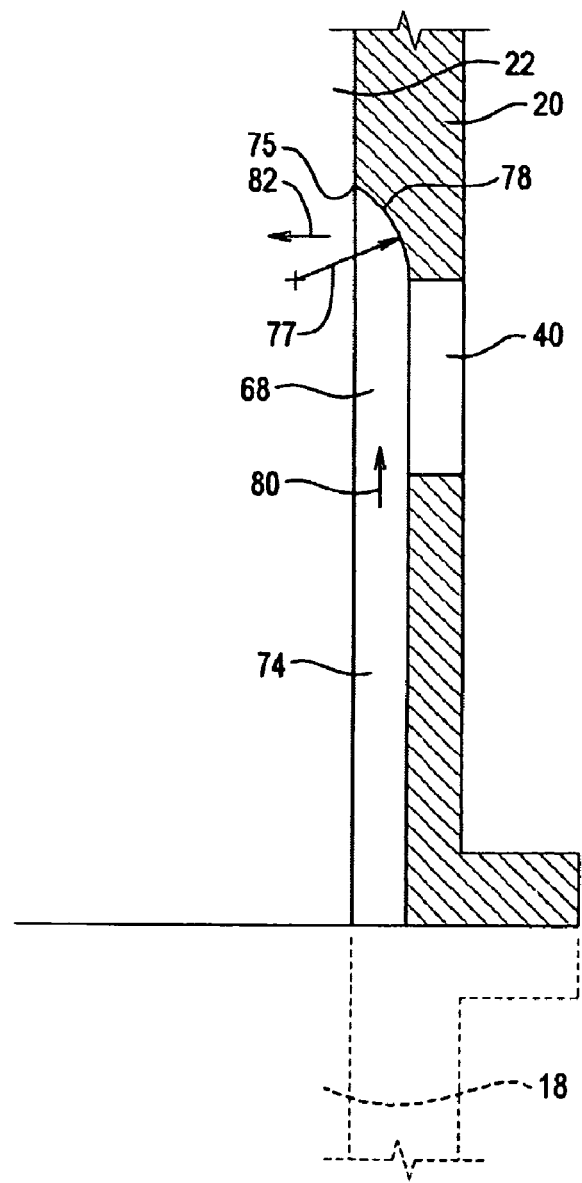
FIG. 6 shows a cross-sectional view of the cylinder wall at the intake port with the modified boost port.

Referring to FIG. 5, the existing intake port 40 is shown in a substantially rectangular configuration with the rectangle arranged with the longer edges or in other words the top length or top leg, and the bottom length or bottom leg, which are substantially horizontal and the short edges substantially vertical. The boost port 68 incorporates the existing intake port 40 but also adds an upper volume region 72 and a lower volume region 74 (or stem). The upper volume region is also substantially rectangular and is constructed by excavating a portion of the cylinder wall to create an inner volume transfer portion 76. Referring to FIG. 6, the cylinder wall 20 is shown in cross-section at the intake port 40 location. The boost port 68 is shown with the upper region 72 and the lower region 74. As previously discussed, the boost port upper region 72 has been excavated out of the wall thickness of the cylinder wall 20. In the current embodiment, the upper region profile has an excavation radius 77 (or semi circular configuration) providing for a smooth flow of the fuel air mixture from the crank case region 18 into the upper chamber region 22. The top edge 75 of the boost port 68 is always placed at the same height (or in other words the rectilinear height which is not greater than 16 mm) as the existing transfer ports' 38, (FIG. 2) top edges. This excavation radius 77 of the upper roof 78 of the boost port 68 provides for a smoother running engine performance with increased power capacity, while a sharper transition (such as a rectilinear configuration or an angular configuration of the upper roof 78) from the vertical flow path 80 to a horizontal flow path 82 provides for greater performance at higher RPM's with less of a smoother running engine at the lower RPM. Varying this transition allows for tuning of the engine's performance characteristics.

The lower volume region 74 of the boost port 68 is provided as a vertical channel running from the base of the intake port to the bottom of the cylinder wall 20 at the interface of the crank case 18. The lower volume region 74 or stem portion has a rectilinear height not greater than 50 mm and a rectilinear width not greater than 26 mm or not greater than two thirds the length of the fuel air intake bottom leg whichever is greater.

Figure 4:
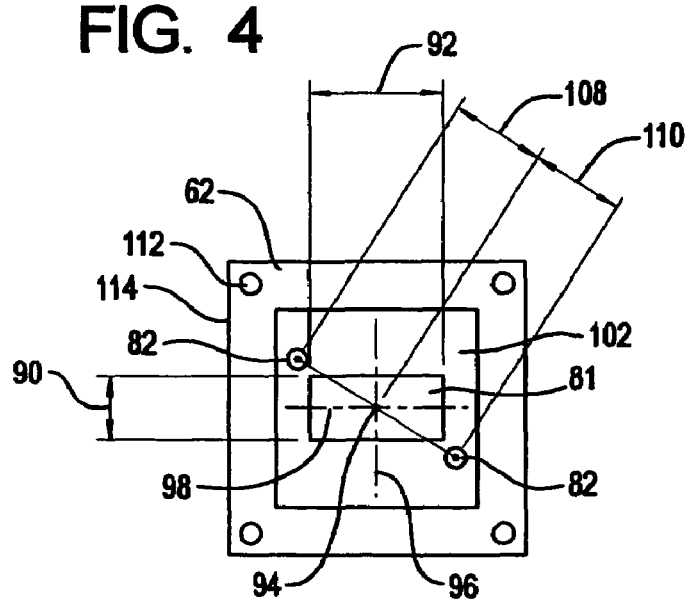
FIG. 4 shows a profile elevational view of the reed valve block modified to fit to the existing cylinder casing.

Referring to FIG. 4, the reed valve block 62 is shown in profile with an exit port 81 for the fuel air charge exiting the reed valve block 62 to exit through the intake port 40. This reed valve exit port 81 is of the same general configuration as the existing intake port 40. Additionally, bolt holes 82 have been configured to match the existing mounting locations on the existing cylinder 20.

The standard Mitsubishi 43 CC to 52 CC two-cycle engine single piston fuel/air intake port 40 as previously mentioned is arranged in a general rectilinear configuration. The port 40 has a rectilinear width of approximately 26 millimeters and a rectilinear height of approximately 16 millimeters.

Generally speaking, the carburetor 42 as previously discussed, attaches to the outside wall of the engine casing. In the standard two-cycle engine, two bolt holes are placed in the engine casing at the perimeter of the intake port 40. These engine casing carburetor connection threaded holes are spaced at opposing corners of the rectilinear intake port 40. These threaded bolt holes are spaced approximately 3 millimeters horizontal and 2 millimeters vertical from the corner edges of the intake port 40.

To attach adequately to the outside of the engine casing, the reed valve block or casing 62 has two bolt holes 82 which are positioned in the front wall 102 of the reed valve casing 62. The bolt holes 82 or attachment holes are aligned along a longitudinal axis approximately 32° from the horizontal plane. Similarly speaking, the reed valve exit port 81 is configured in a rectilinear fashion to match the previously mentioned intake port 40. The reed exit port 81 has a reed casing exit port width 92 which is equal to the rectilinear width of the intake port 40, and a reed casing exit port height 90 which matches the rectilinear height of the intake port 40.

Figure 4B:
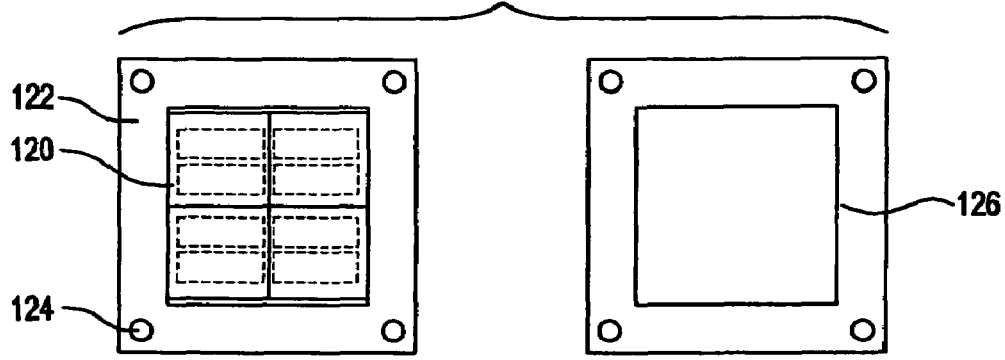
FIG. 4B shows a top-down view of the reed valve and reed valve base plate.

To attach the reed valve itself to the interior portion of the reed valve casing 62, the reed valve 120 (as seen in FIG. 4B) is mounted on the front face of the reed valve base plate 122. To make the connection between the reed valve 120 and the reed valve casing 62, the reed valve casing 62 has a perimeter edge 114 (as seen in FIG. 4), which has four equally spaced threaded reed valve base plate connection holes 112 with equidistant spacing of 40 mm in the horizontal direction and 35 mm in the vertical direction. The reed valve base plate 122 (as seen in FIG. 4B) has four matching through bolt holes 124.

To provide for adequate sealing between the two metallic surfaces, a manifold 126 is interspersed between the front face of the reed valve base plate 122 and the reed valve casing perimeter edge 114.

Figure 4C:
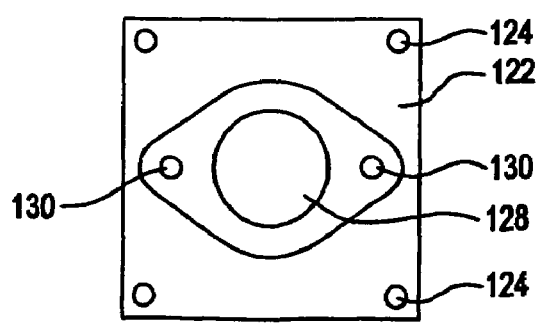
FIG. 4C shows a plan view of the reed valve base plate back face at the carburetor connection point.

To provide for mounting of the existing carburetor 42 to the engine, the reed valve base plate 122 (as seen in FIG. 4C), has on the rear face of the base plate, an intake port 128 and two threaded reed valve base plate connection holes 130 on either side of the intake port 128 to provide for securing the carburetor 42 to the reed valve 60.

When all the parts are mounted in place, the reed valve modification kit 60 provides for substantial additional fuel/air mixture volume to be added to the combustion chamber and provide additional horsepower to the two-cycle single piston combustion engine.

Figure 9:
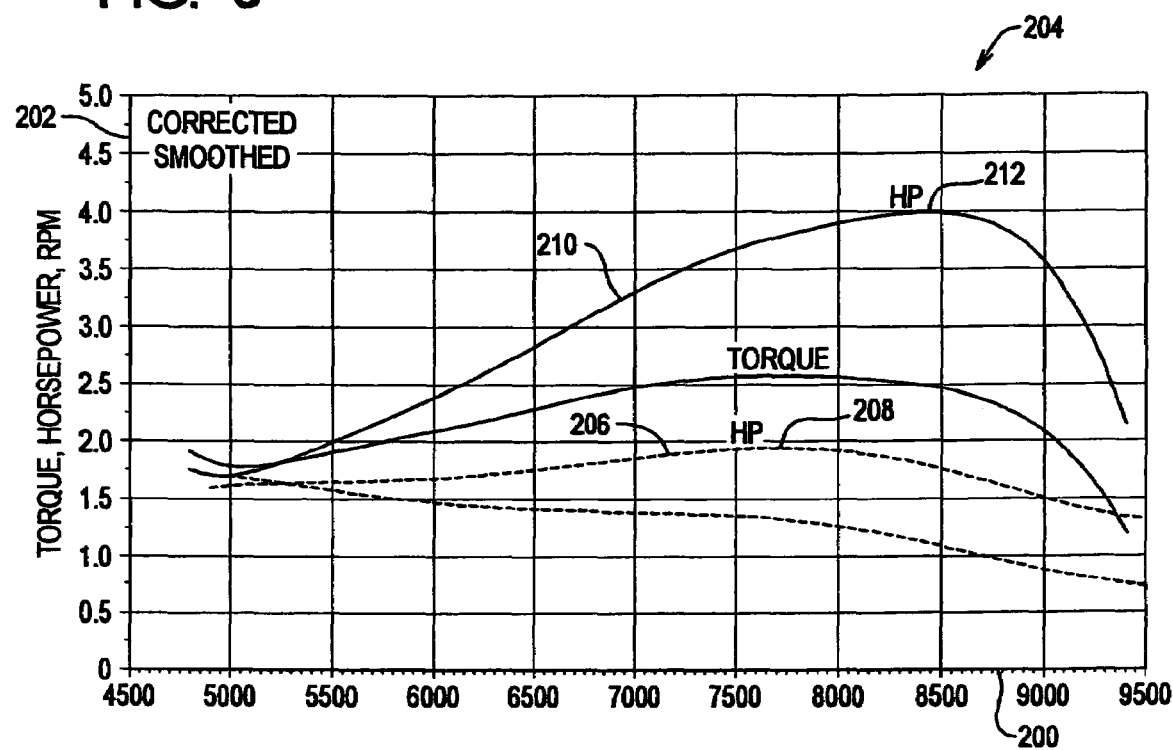
FIG. 9 shows a DYNOmite test graph comparing a stock two-cylinder single piston engine with the present embodiment.

To demonstrate the substantial increase in horsepower output and torque capacity, a DYNOmite test by Cobra Dyno Services™ as seen in FIG. 9 is provided. The test was run on two engines. The first was an unmodified 43 CC stock two-cycle single cylinder combustion engine. The second test was run on a modified 43 CC two-cycle single piston combustion engine with the addition of the reed valve kit, and the boost port or mushroom port modifications as previously discussed. The roof of the mushroom port utilized a curved radius roof profile. The tests were run on each engine at full throttle ranging from an initial rpm as seen in the X-axis 200 of FIG. 9 from between approximately 4700 rpm to just less than 9500 rpm. The Y-axis 202 shows the range of horsepower and torque ranging from 0 horsepower to 5 horsepower. As plotted in the graph 204, the first engine horsepower plot 206 had a maximum horsepower 208 of approximately 1.9 horsepower correlating to approximately 7700 RPMs. With the modified engine, the second engine plot 210 had a maximum horsepower 212 of approximately 4 horsepower correlating to an rpm of approximately 8450 rpm. By using the reed valve induction kit with the boost port or mushroom port modifications for an additional transfer port, over 100% increase in horsepower was achieved.

Figure 7:
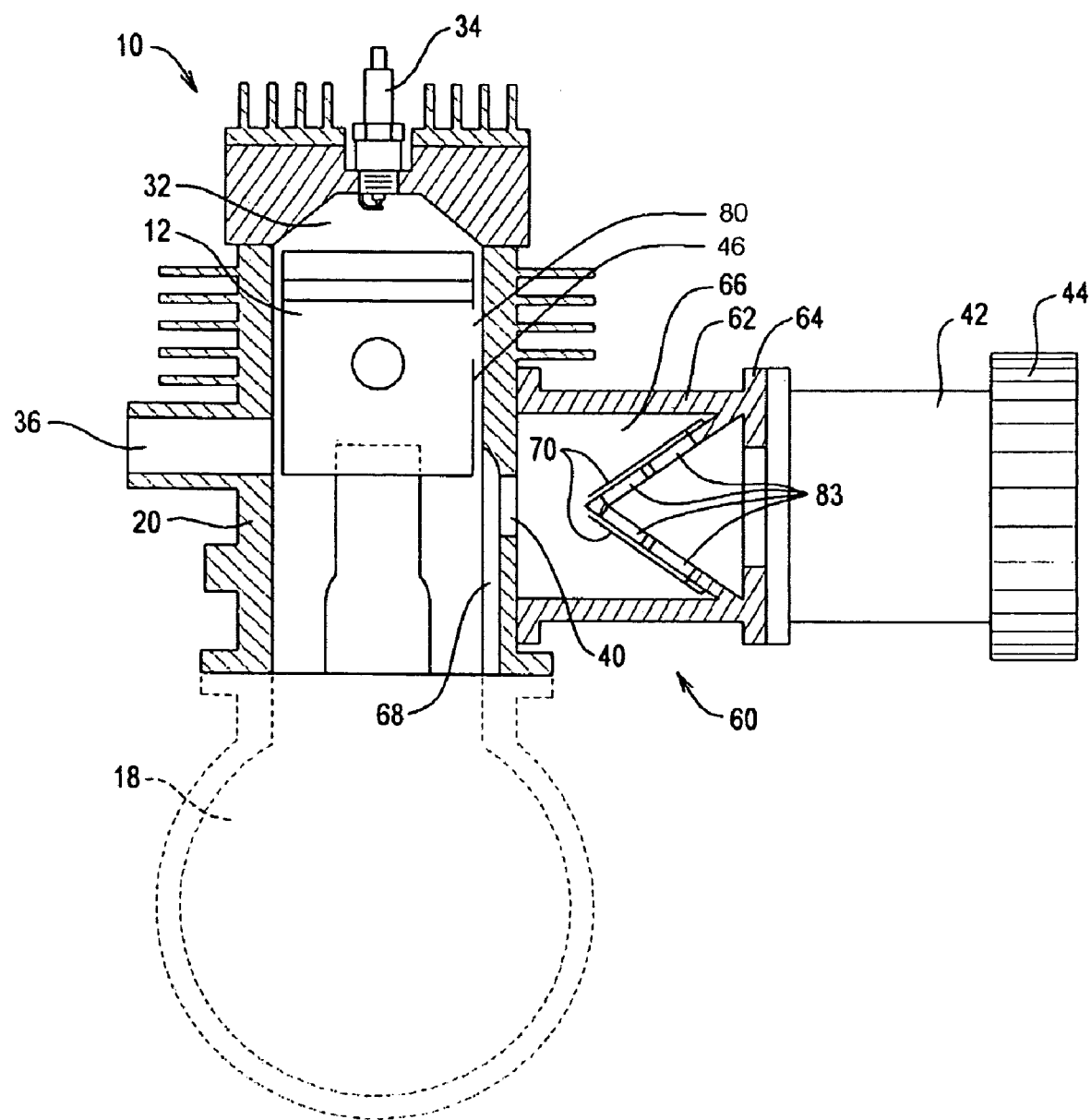
FIG. 7 shows a profile cross-sectional view of a modified two-stroke engine with an additional reed valve and modified intake port assembly with piston near the top of the upstroke cycle.
Figure 8:
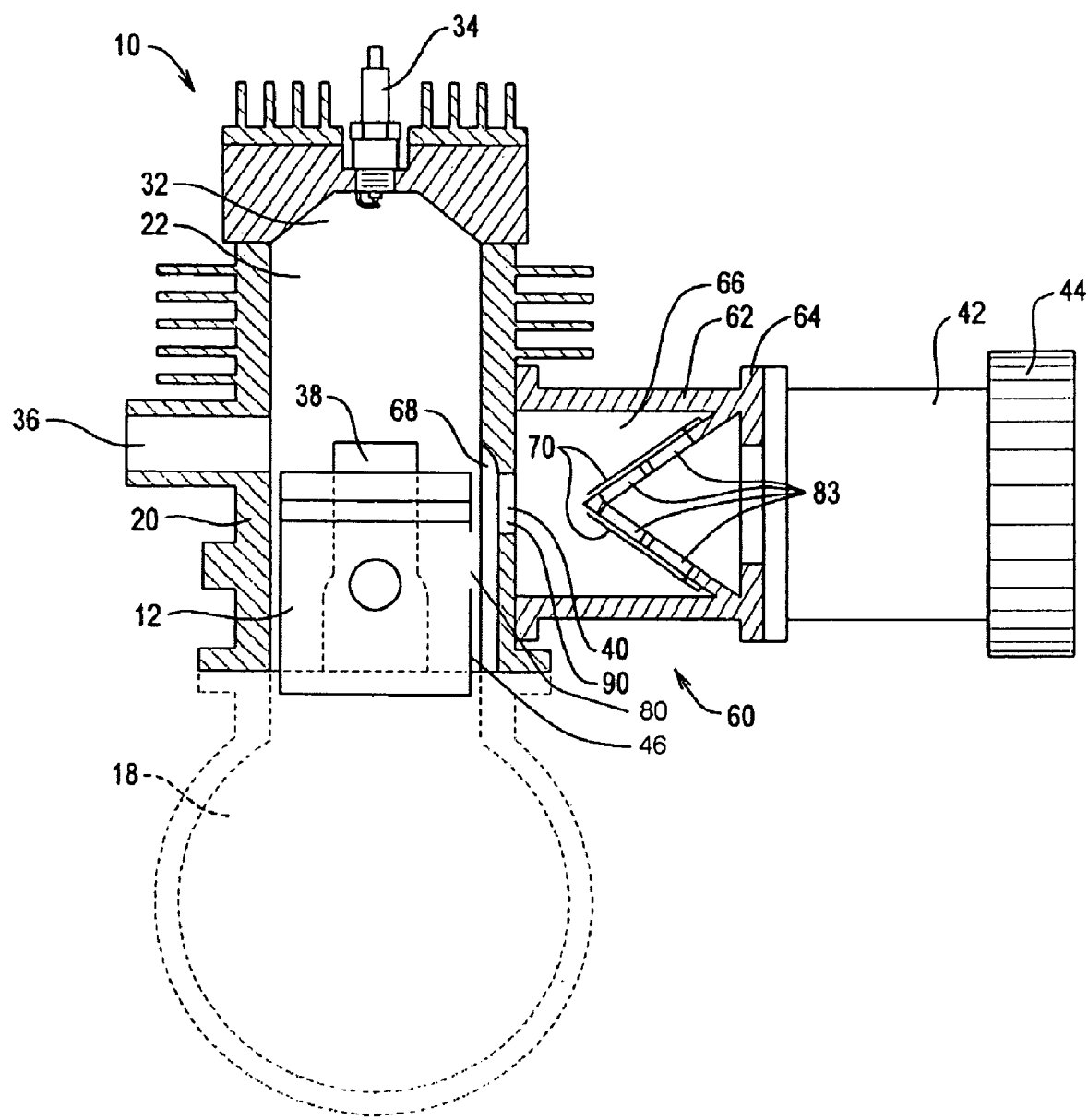
FIG. 8 shows a profile cross-sectional view of a modified two-stroke engine with an additional reed valve and modified intake port assembly with piston near the bottom of the down stroke cycle.

A brief discussion of the operation of the two-stroke engine 10 with the modified boost port and reed valve assembly 60 installed on the cylinder casing 20 will now be provided. Referring to FIG. 7, the piston cylinder 12 is at the top dead center of the upstroke and has compressed the air fuel charge into the compression chamber 32. The spark plug 34 ignites and provides the combustion to drive the piston 12 down during the down stroke. Referring to FIG. 8, the piston 12 has within its piston skirt 46 a piston port 80 which corresponds to the same radial position as the boost port 68 within the cylinder wall 20.

As the piston travels downward, the exhaust port 36 is opened to allow the spent fuel vapor to exit and the piston during its downward cycle is beginning positive pressure within the crank case region 18. The crank case region 18 also includes positive pressure in the reed valve inner chamber 66, which provides for greater volume of the fuel air charge to be pumped into the combustion chamber 32. During the downward stroke when the pressure within the crank case chamber 18 and reed valve chamber 66 is positive the reed valve flaps 70 are closed to seal the reed valve ports 83 so that the fuel air charge can not exit through the carburetor 42. Without the reed valve flaps 70, the positive pressure within the crank case 18 and reed valve chamber 66 would not occur and the two-stroke engine process would fail.

As the piston 12 drops below the top edge of the transfer ports 38 and the boost port 68, both edges being within the same vertical plane, the pressurized air fuel within the crank case 18 and the reed valve 66 begins to flow through the transfer and boost ports into the upper chamber region 22 of the cylinder 20. Thus scavenging of the upper cylinder region 22 occurs clearing it of excess combusted charge. The additional fuel air charge from the inner chamber of the reed valve block 62 provides for additional fuel and air to enter into the upper chamber region 22 for a more pure fuel air mix as well as a higher density or volume of un-combusted fuel air.

Referring to the FIG. 7, the piston begins its upstroke cycle and immediately starts a vacuum within the crank case 18 and the reed valve inner chamber 66. The negative pressure within the reed valve chamber 66 draws fuel and air vapor through the reed valve ports 83 and through the unsealed reed valve flaps 70. The piston port 90 being within the piston skirt 46 allows the fuel vapor charge flow from the carburetor into the reed valve port chamber 66, through the boost port 68 and into the crank case 18 to stay substantially constant during the entire upstroke cycle. This longer access time to the inner chamber region of the crank case 18 creates the negative draw pressure within the charge regions including the crank case 18 and the reed valve inner chamber 66 providing greater amount of fuel and air charge to enter into the charging regions for subsequent combustion and consequently providing greater power.

I claim:

1. An assembly for modifying existing two-stroke single cycle 43 CC to 52 CC combustion engines for increase in horsepower, said assembly comprising:
    a. a two-stroke single piston engine cylinder having a wall thickness and a piston with piston skirt, said engine cylinder having two transfer ports and a fuel air intake port, said engine cylinder further comprising an additional transfer port, said additional transfer port having a mushroom shape configuration and excavated out of the interior face of said engine cylinder and the profile of said transfer port encompassing said fuel air intake port;
    b. a reed valve kit substantially configured to attach to the outer wall of said engine cylinder, said reed valve kit interposed between the fuel air intake port and the carburetor of said two stroke combustion engine;
    c. said mushroom shaped transfer port further comprising a top portion and a stem portion, said top portion including the fuel air intake port and a substantially rectilinear roof portion extending above the fuel air intake port, said stem portion in a substantially rectilinear configuration extending below said fuel air intake port;
    d. said mushroom shaped transfer port further comprising:
        i. the fuel air intake port having a rectilinear profile configuration with parallel top and bottom legs and parallel side legs;
        ii. said roof portion having a rectilinear width matching said fuel air intake top leg length, a rectilinear height extending to the same vertical height as the existing transfer ports;
        iii. said stem portion having a rectilinear width not more than two thirds the length of said fuel air intake bottom leg, a rectilinear height extending into the crank case of said engine cylinder.

2. The assembly according to claim 1, above wherein said fuel air intake port rectilinear width is not greater than 26 millimeters said rectilinear height is not greater than 16 mm.

3. The assembly according to claim 2, above wherein said roof portion rectilinear height is not greater than 16 mm.

4. The assembly according to claim 2, above wherein said stem portion rectilinear height is not greater than 50 mm.

5. The assembly according to claim 2, above wherein said stem portion rectilinear width is not greater than 26 mm.

6. The assembly according to claim 1, wherein said assembly further comprises: said combustion engine cylinder comprising a stock two threaded hole connection for securing a stock carburetor.

7. The assembly according to claim 6, wherein said said reed valve kit further comprises:
    a. a reed valve casing and a reed valve, said reed valve attached to a back plate, said reed valve back plate having a two threaded hole connection arrangement for securing said carburetor to said reed valve;
    b. said reed valve casing further comprised of a front wall comprising two bore holes arranged in line with said combustion engine cylinder stock two threaded hole connection for securing said stock carburetor.

8. The assembly according to claim 6, wherein said said reed valve kit further comprises:
    a. a reed valve casing configured in a boxlike arrangement and comprising:
        i. a front wall with a fuel/air exit port substantially matching the size of the combustion engine fuel air intake port;
        ii. said front wall further comprising two bore holes matching said stock two threaded hole connection;
        iii. a top wall, bottom wall, and two sidewalls, and an opening where a back wall would be completed to seal the box, said opening allowing for insertion of a reed valve;
    b. said reed valve connected to a base plate, said base plate comprising a centrally aligned fuel/air intake port substantially matching the size of the combustion engine fuel/air intake port, two threaded attachment holes matching said stock two threaded hole connection on said engine casing;

c. a manifold gasket positioned between the reed valve casing having a perimeter edge defining said opening, and said reed valve base plate;

d. a plurality of threaded through bolts for assembling together said reed valve kit.

9. The assembly according to claim 8, wherein said combustion engine fuel/air intake port further comprises:

a. a transverse alignment along a central axis, the central axis centered within said fuel/air intake port;

b. said two carburetor threaded attachment holes positioned opposingly opposite to one another along a longitudinally aligned angular axis arranged approximately 32° from the horizontal plane and centered on said central axis;

c. said carburetor threaded attachment holes positioned longitudinally approximately 19 mm from the central axis along said angular axis;

d. said reed valve kit further comprising: said two front wall bore holes positioned within said front wall of said reed valve casing arranged to match the location of said two carburetor threaded attachment holes.

10. The assembly according to claim 9, wherein said reed valve kit further comprises: said fuel/air exit port having a transversely aligned central axis matching said combustion engine fuel/air intake port transversely aligned central axis when said reed valve modification kit is attached to the outside of said engine casing.

11. The assembly according to claim 10, wherein said reed valve base plate further comprises: two threaded attachment holes matching said two carburetor threaded attachment holes positioned opposingly opposite to one another along said longitudinally aligned angular axis arranged approximately 32° from the horizontal plane.

12. The assembly according to claim 10, wherein said reed valve casing perimeter edge and said reed valve base plate further comprises: the reed valve casing perimeter edge having threaded reed valve base plate connection holes equidistantly spaced at the corners of said reed valve casing perimeter edge, said reed valve base plate having equidistantly spaced base plate through bolt holes matching said equidistantly spaced reed valve casing perimeter edge threaded reed valve base plate connection holes.

13. The assembly according to claim 12, wherein said casing perimeter edge threaded holes further comprise: an equidistant spacing of 40 mm in the horizontal direction and 35 mm in the vertical direction.

14. The assembly according to claim 12, wherein said base plate further comprises: said through bolt holes spaced equidistantly apart 40 mm in the horizontal direction and 35 mm in the vertical direction.

15. The assembly according to claim 1, above wherein said roof portion of said mushroom port further comprises:

a. a roof profile having a semi circular configuration.

16. The assembly according to claim 1, wherein said assembly further comprises: a modified piston skirt comprising a port through the skirt of said piston providing a constant influx of fuel/air mixture from said reed valve into said combustion engine crank case chamber.

17. A method to increase the horsepower output of a two-stroke single cylinder 43 CC to 52 CC combustion engine, said method comprising:

a. excavating a boost port within the inner chamber of the combustion engine below and above an intake port of the combustion engine;

b. said boost port further comprising, a mushroom-shaped transfer port comprising a top portion and a stem portion, said top portion including a fuel air intake port and a substantially rectilinear roof portion extending above said fuel air intake port, said stem portion configured as a substantially rectilinear arrangement extending below said fuel air intake port;

c. said mushroom-shaped transfer port further comprising:

i. said fuel air intake port comprising a rectilinear profile configuration with parallel top and bottom legs and parallel side legs;

ii. said roof portion comprising a rectilinear width matching said fuel air intake top leg length, a rectilinear height extending to the same vertical height as an existing transfer port;

iii. said stem portion comprising a rectilinear width not more than two thirds the length of said fuel air intake bottom leg, and rectilinear height extending into a crankcase of said combustion engine;

d. attaching a reed valve casing to the outside of said combustion engine at the fuel/air intake port;

e. attaching a reed valve within said reed valve casing;

f. attaching a carburetor to said reed valve casing.

* * * * *